US012673896B2

(12) United States Patent
Gutknecht et al.

(10) Patent No.: US 12,673,896 B2
(45) Date of Patent: Jul. 7, 2026

(54) METHOD AND SYSTEM FOR PROCESSING CONCRETE GRANULES

(71) Applicants: ETH Zürich, Zürich (CH); Neustark AG, Bern (CH)

(72) Inventors: Valentin Gutknecht, Bern (CH); Marco Mazzotti, Zürich (CH); Johannes Tiefenthaler, Zürich (CH)

(73) Assignees: ETH Zürich, Zürich (CH); Neustark AG, Bern (CH)

( * ) Notice: Subject to any disclaimer, the term of this patent is extended or adjusted under 35 U.S.C. 154(b) by 746 days.

(21) Appl. No.: 17/925,307

(22) PCT Filed: May 12, 2021

(86) PCT No.: PCT/EP2021/062696
§ 371 (c)(1),
(2) Date: Nov. 14, 2022

(87) PCT Pub. No.: WO2021/228979
PCT Pub. Date: Nov. 18, 2021

(65) Prior Publication Data
US 2023/0227356 A1 Jul. 20, 2023

(30) Foreign Application Priority Data

May 15, 2020 (EP) ..................................... 20174964

(51) Int. Cl.
*C04B 18/167* (2023.01)
*B01D 53/34* (2006.01)
(Continued)

(52) U.S. Cl.
CPC .......... *C04B 18/167* (2013.01); *B01D 53/346* (2013.01); *B01D 53/62* (2013.01);
(Continued)

(58) Field of Classification Search
CPC ........ B01D 53/34; B01D 53/62; B01D 53/81; B28B 11/24; B28C 7/00; C04B 18/167;
(Continued)

(56) References Cited

U.S. PATENT DOCUMENTS

| | | | |
|---|---|---|---|
| 9,108,883 B2 * | 8/2015 | Forgeron ................ | B28C 9/002 |
| 2007/0154380 A1 | 7/2007 | Takahashi et al. | |
| 2016/0046532 A1 | 2/2016 | Juilland et al. | |

FOREIGN PATENT DOCUMENTS

| | | | |
|---|---|---|---|
| DE | 102018123115 A1 | 3/2020 | |
| EP | 3581257 A1 * | 12/2019 | ............. C04B 18/16 |

(Continued)

OTHER PUBLICATIONS

International Search Report for PCT/EP2021/062696 mailed Aug. 16, 2021 (Entire Document).

(Continued)

*Primary Examiner* — Sharon Pregler
(74) *Attorney, Agent, or Firm* — GrowIP Law Group LLC

(57) ABSTRACT

The disclosure provides a method and a system for processing concrete granulate for subsequent recycling of the concrete granulate. In the method, a container of the system is filled with concrete granulate, said container being gas-tight at least in some regions. Subsequently, gas comprising $CO_2$ is fed, continuously or noncontinuously, according to a level of $CO_2$ absorption by the concrete granulate in the container, said level being determined by means of at least one sensor. After a predefined $CO_2$ saturation of the concrete granulate has been detected, the concrete granulate, which have been enriched with $CO_2$, are removed.

20 Claims, 2 Drawing Sheets

(51) Int. Cl.
| | | |
|---|---|---|
| *B01D 53/62* | (2006.01) | |
| *B01D 53/81* | (2006.01) | |
| *B28B 11/24* | (2006.01) | |
| *B28C 7/00* | (2006.01) | |

(52) U.S. Cl.
CPC ............ *B01D 53/81* (2013.01); *B28B 11/245* (2013.01); *B28C 7/0007* (2013.01); *B01D 2257/504* (2013.01)

(58) Field of Classification Search
CPC .............. C04B 20/023; C04B 40/0231; C04B 40/0236
See application file for complete search history.

(56) References Cited

FOREIGN PATENT DOCUMENTS

| EP | 3909735 A1 | 11/2021 |
|---|---|---|
| FR | 3081863 A1 | 12/2019 |
| JP | 2000247711 A | 9/2000 |
| JP | 2006143531 A | 6/2006 |
| JP | 2020131076 A | 8/2020 |
| JP | 2021155271 A | 10/2021 |
| KR | 100970431 B1 | 7/2010 |
| RU | 2012153261 A | 6/2014 |
| WO | 2020058247 A1 | 3/2020 |

OTHER PUBLICATIONS

Liu Let al. "Development of a CO2 Solidification Method for Recycling Autoclaved Lightweight Concrete Waste", Journal of Materials Science Letters, Chapman and Hall Ltd. London, GB, vol. 20, No. 19, Oct. 1, 2001 (Oct. 1, 2001), pp. 1791-1794 DOI: 10.1023/A:1012591318077 ISSN: 0261-8028, XP001242122 (Entire Document).

Marko Seidemann et al. "Werterentwicklung der Karbonatisierung von rezyklierten Zuschlagen aus Altbeton (2. Phase: Prozessoptimierung im LabormaBstab und Technologieentwurf)" Nov. 30, 2015 (Nov. 30, 2015). pp. 1-99. Abschlussbericht Uber Ein Entwicklungsprojekt. Gefordert Unter Dem AZ: 23689/02 Von Der Deutschen Bundesstiftung Umwelt. Professur Werkstoffe Des Bauens; Bauhaus-Universitat Weimar. Weimar. DE.

Seidemann Met al. "CO2—Einbindung in Betonrezyklaten" Sep. 1, 2013 (Sep. 1, 2013). pp. 1-10. Fachtagung Recycling R'I3. Sep. 19-20, 2013. Bauhaus-Universitat Weimar. ABW—Aufbereitung Von Baustoffen Und Wiederverwertung E. V. Weimar. DE. Retrieved from the Internet: http://www.abw-recycling.de/rl 3/Seidemann_BUW _CO2-Einbindung_RI 3.pdf XP009523819 (Entire Document).

Zhan Bao Jian et al. "Materials characteristics affecting CO2curing of concrete blocks containing recycled aggregates", Cement and Concrete Composites, Elsevier Applied Science, Barking, GB, vol. 67, Jan. 2, 2016 (Jan. 2, 2016), pp. 50-59 DOI: 10.1016/J. CEMCONCOMP.2015.12.003 ISSN: 0958-9465, XP029409404 (Entire Document).

Zhan Baojian et al. "Experimental study on CO2curing for enhancement of recycled aggregate properties", Construction and Building Materials, Elsevier, Netherlands, vol. 67, Sep. 26, 2013 (Sep. 26, 2013), pp. 3-7 DOI: 10.1016/J.CONBUILDMAT.2013.09.008 ISSN: 0950-0618, XP029016617 (Entire Document).

Dos Reis, G.S., et al., "Accelerated Carbonation of Coarse Aggregates by Using a Rotating System in Order to Improve its Properties", Proceedings of the International Workshop CO2 Storage in Concrete CO2STO2019, France, Marne La Vallée, Ifsttar, Jun. 24-25, 2019, pp. 1-11.

Engelsen, C.J., et al., "Carbon dioxide uptake in demolished and crushed concrete", BYGGFORSK Norwegian Building Research Institute, Project report 395, published 2005, pp. 1-38.

Seidemann, M., et al., "Further development of the carbonation of recycled aggregates from old concrete (2nd phase: process—optimization on a laboratory scale and technology design)", Professorship for Building Materials at the Bauhaus University Weimar, Nov. 30, 2015, pp. 1-201.

Seidemann, M., et al., "Targeted carbonation of recycled aggregates for the simultaneous use of concrete rubble and improvement of material properties as a contribution to CO2 reduction", Professorship for the Processing of Building Materials and Recycling, Bauhaus University Weimar, Dec. 31, 2010, pp. 1-180.

Sereng, M., et al., "Effect of Carbonation on Recycled Concrete Aggregates and Water Absorption", International Workshop CO2 Storage in Concrete, CO2STO2019, Jun. 24-25, 2019, Ifsttar, Marne La Vallée, France, pp. 1-12.

First Office Action and Search Report for Russian Patent Application No. 2022132013 (search completed Aug. 23, 2024).

\* cited by examiner

METHOD AND SYSTEM FOR PROCESSING CONCRETE GRANULES

CROSS-REFERENCE TO RELATED APPLICATIONS

This application is a U.S. National Stage Application of International PCT Application No. PCT/EP2021/062696, filed on May 12, 2021, that claims priority to European Patent Application No. EP20174964.5, filed on May 15, 2020, which are all hereby incorporated by reference in their entirety.

TECHNICAL FIELD

The present disclosure relates to a method and a system for processing concrete granulate for subsequent recycling of the concrete granulate. In particular, the present disclosure relates to a method and a system for enriching concrete granulate with $CO_2$. Furthermore, the disclosure relates to a concrete granulate that can be produced according to the method of the disclosure, as well as to a concrete.

BACKGROUND

In addition to gravel and sand, cement is of central importance for the production of concrete. However, the production of cement not only releases considerable greenhouse gas emissions, it is also a significant cost factor in production of concrete. Today, recycling concrete already plays an important role when it comes to conserving gravel and sand as a resource. However, conventional recycling processes can neither recover cement nor reverse or avoid greenhouse gas emissions. Conventional recycling is usually done by dismantling demolished houses or other concrete structures. The demolition concrete is then crushed into concrete granulate, which can be used, for example, as a gravel substitute in the production of new concrete. With the addition of new cement, recycled concrete is produced. However, this conventional recycled concrete usually has reduced mechanical properties compared to the primary concrete. Primary concrete is understood to be non-recycled concrete. Therefore, the cement content in the conventionally recycled concrete is usually increased by 10% in order to obtain recycled concrete of a quality similar to that of the primary concrete. Furthermore, the concrete granulate obtained from the demolition concrete can be used loose in an unbound state, e.g. as road construction material. However, the application is severely limited, since toxic metals are contained in the concrete due to its production, which can be dissolved by rainwater, especially in the loose (unbound) state of the concrete granulate known from the state of the art, and thus contaminate the groundwater. For the reasons mentioned above, today's concrete recycling yields at best low-grade gravel substitutes; however, this recovery neither reduces the greenhouse gas emissions of the concrete nor can the concrete granulate be used loose without hesitation.

SUMMARY

One task of the disclosure is to provide an improved method and a system for processing concrete granulate for subsequent recycling of the concrete granulate. Preferably, the aforementioned problems of known recycling methods are at least partially eliminated.

To prepare concrete granulate for subsequent recycling of the concrete granulate, it can be treated with carbon dioxide (hereafter abbreviated as $CO_2$). Compared to a recycled reference concrete (comprising cement, gravel, sand and unenriched concrete granulate) with an enriched concrete of substantially the same composition, the enriched concrete (comprising cement, gravel, sand and $CO_2$-enriched concrete granulate) may have a higher compressive strength with substantially the same slump. The latter is a parameter for the consistency of fresh concrete. Likewise, with a corresponding reduction in the cement content of the enriched concrete, the same compressive strength can be achieved in comparison with the reference concrete with unchanged composition.

These relationships can be comprehended in the following tables. These show the compositions (Table 1) and measurement results (Table 2) of a reference concrete and various test concretes. The reference concrete comprises conventional concrete granulate, which is not enriched with $CO_2$. The concrete granulate of the test concretes, on the other hand, is enriched with $CO_2$. The compressive strength was determined according to the SN EN 206: 2013+A1:2016 standard and according to the SIA bulletin '2030 Recycled Concrete'. The slump was determined according to the SN EN 12350-5: 2019 standard.

TABLE 1

| Designation | Cement CEM II/B-LL $(kg/m^3)$ | Water $(kg/m^3)$ | Sand and gravel $(kg/m^3)$ | Concrete granulate $(kg/m^3)$ | $CO_2$ $(kg/m^3)$ |
|---|---|---|---|---|---|
| Reference concrete | 315 | 191 | 1134 | 756 | 0 |
| Trial concrete 1 | 315 | 186 | 1117 | 746 | 5.1 |
| Trial concrete 2 | 315 | 183 | 755 | 1133 | 7.6 |
| Trial concrete 3 | 290 | 167 | 1080 | 719 | 4.9 |

TABLE 2

| Designation | Compressive strength $(N/mm^2)$ | Slump (cm) |
|---|---|---|
| Reference concrete | 43.8 | 48 |
| Trial concrete 1 | 46.9 | 48 |
| Trial concrete 2 | 47.7 | 47 |
| Trial concrete 3 | 45.3 | 47 |

The enriched concrete with a correspondingly reduced cement content (e.g. trial concrete 3) has significantly reduced greenhouse gas emissions. For example, with a cement reduction of 10%, the emissions from production of concrete can be reduced by approx. 8.5%. On the other hand, $CO_2$ emissions already present can be bound to the concrete granulate during the method and therefore reduced. For example, with an average of 10 kg $CO_2$ per 1000 kg concrete granulate, emissions can be reduced by a further 4% on average. Under ideal conditions, the technology can reduce $CO_2$ emissions from the production of recycled concrete by approx. 12.5%.

Furthermore, it has been shown that the enriched concrete has a higher carbonation resistance. The carbonation resistance is a decisive factor for the corrosion of a reinforcement cast in the concrete and the damage that occurs in concrete construction. Likewise, the enrichment of the concrete granulate with $CO_2$ can lead to a better bound of the above-mentioned toxic metals and their unintentional escape into the environment being significantly reduced. This expands the application possibilities of loose concrete granulate.

A method according to the disclosure for processing, in particular for enriching with $CO_2$, concrete granulate for subsequent recycling comprises the following method steps: Filling a at least partially gas-tight container with concrete granulate. Supply of a volume flow of gas comprising $CO_2$ as a function of a measure, determined via at least one sensor, of $CO_2$ absorption by the concrete granulate in the container. The supply of the gas can be continuous or discontinuous. Determining whether a predefined $CO_2$ saturation of the concrete granulate has been reached, and otherwise continuing the previous method step concerning the supply of the gas. Depending on the application, if a predefined $CO_2$ saturation of the concrete granulate has not yet been reached, the gas may be supplied continuously or non-continuously until this is reached. Furthermore, the method comprises the removal of the $CO_2$-enriched concrete granulate from the container. Once the concrete granulate have been removed, they may be used in a further method step to produce recycled (enriched) concrete comprising the $CO_2$-enriched concrete granulate. For this purpose, the $CO_2$-enriched concrete granulate may be processed with cement, water, sand and gravel to produce concrete.

$CO_2$ absorption of the concrete granulate is understood to mean that the $CO_2$ diffuses into the concrete granulate and enters into a chemical reaction. For this absorption method, no additional water, especially in liquid form, needs to be added to the container. The concrete granulate includes pores into which the $CO_2$ can diffuse. Water may be present in the pores, as so called pore water, with which the $CO_2$ enters into a chemical reaction. The pore water is in phase equilibrium with the cement phases of the concrete granulate and includes calcium ions. When $CO_2$ is (chemically) absorbed, carbonate and bicarbonate ions are formed. The resulting pore solution is thus supersaturated in terms of calcium carbonate ($CaCO_3$), respectively its polymorphic minerals calcite, aragonite and vaterite, and the pores are filled.

However, the concrete granulate may only absorb a certain amount of $CO_2$ depending on its composition. This maximum $CO_2$ saturation may be between 30-45 kg $CO_2$ per 1000 kg concrete granulate, depending on the composition. The present method may be carried out (at least approximately) up to the respective maximum $CO_2$ saturation of the concrete granulate in the container. For example, when no more change in $CO_2$ concentration and/or change in pressure can be detected per initial volume of gas, the maximum $CO_2$ saturation of the concrete granulate has been reached. However, the method may also be stopped beforehand when a predefined $CO_2$ saturation below the maximum $CO_2$ saturation is reached. The predefined $CO_2$ saturation of the concrete granulate may be between 5% and 100% of the maximum $CO_2$ saturation. However, high saturation values may only be achieved with sufficiently long gassing with $CO_2$ and require correspondingly larger quantities of $CO_2$. However, good material properties may already be achieved at a given $CO_2$ saturation between 5 kg $CO_2$ per 1000 kg to 15 kg $CO_2$ per 1000 kg. This corresponds to a given $CO_2$ saturation of about 10% to 50% of the maximum $CO_2$ saturation.

The amount of absorbed $CO_2$ in the concrete granulate usually decreases exponentially over time until the maximum $CO_2$ saturation is reached. The predefined $CO_2$ saturation for an example may be considered to have been reached if, over a certain time interval, the change in the measure of $CO_2$ absorption is smaller than a predefined limit value. Alternatively or additionally, in order to determine the predefined $CO_2$ saturation, for example, the measure of the $CO_2$ absorption that has occurred, as determined via the at least one sensor, may be plotted over time and extrapolated. The extrapolation may be used to determine a (theoretical) limit value of the measure of the occurred $CO_2$ absorption which corresponds to the maximum $CO_2$ saturation of the concrete granulate in the container. When a predefined percentage of this limit value (or the predefined $CO_2$ saturation respectively) is reached, the gas supply may be stopped.

The supply of the gas into the container, respectively an adjustment of the supplied volume flow into the container, may be carried out via an adjustment of an inlet valve. The inlet valve may be arranged in the supply line of the container. The adjustment of the inlet valve, respectively of the volume flow, in dependence on the measure of the occurred $CO_2$ absorption is carried out by a control unit which is operatively connected to the at least one sensor as well as to the inlet valve. Advantageously, the supplied volume flow of gas (after an initial filling of the container) compensates the $CO_2$ already absorbed. In this way, the $CO_2$ concentration in the container is as constant as possible. This has the advantage that with a higher $CO_2$ concentration and a uniform distribution of $CO_2$ in the container, on the one hand, the method runs faster and, on the other hand, a uniform enrichment of $CO_2$ in the concrete granulate may be achieved. The control unit may determine a theoretical amount of $CO_2$ present in the container that would be present without absorption of $CO_2$ from the known composition of the gas, or the $CO_2$ content of the gas, as well as from the known volume flow supplied through the inlet valve. Likewise, a theoretical pressure in the container may be determined. For this purpose, the inlet valve may comprise a flow sensor for determining the volume flow passing through the inlet valve, or a flow sensor may be connected upstream or downstream of the inlet valve. Alternatively or as a supplement to the use of the flow sensor, the volume flow carried out may be stored as a data record in a control unit as a function of the setting of the inlet valve.

The supply of the gas may be interrupted at least temporarily (non-continuous supply of the gas). This may be done by repeatedly carrying out the following sequence of steps: Opening the inlet valve fluidically operatively connected to the container, feeding the gas comprising $CO_2$ into the container and closing the inlet valve. When the inlet valve is closed, the measure of the occurred $CO_2$ absorption can be determined easily. Advantageously, the volume flow of gas supplied when the inlet valve is open compensates the $CO_2$ absorbed in the meantime (during the closed inlet valve). This non-continuous gassing may be continued until the predefined $CO_2$ saturation of the concrete granulate is reached. A non-continuous supply of the gas is particularly suitable for containers, which (during gassing) are at least partially open to the environment or ambient air. Such a container can in particular be open at the top.

As an alternative to non-continuous gassing, the volume flow may be continuously adjusted over the duration of the gassing depending on the measure of the occurred $CO_2$ absorption (continuous supply of gas). Advantageously, the supplied volume flow of gas compensates the CO2 already absorbed. If the absorption of CO2 decreases exponentially over time, the supplied volume flow can be adjusted so that it decreases exponentially.

An (initial) filling of the container with the gas may be carried out until a desired filling level of the container with the gas is reached. Alternatively or as a supplement, the (initial) filling of the container may be carried out until a predefined CO2 concentration, in particular a concentration of more than 95% CO2, is present in the container. After the initial filling, the volume flow may be reduced (further continuous supply) or interrupted in the meantime (non-continuous supply). Here, the further supplied volume flow can be controlled, as already described, in such a way that the CO2 absorbed in the container is compensated.

To determine the measure of the occurred CO2 absorption by the concrete granulate, at least one sensor may be arranged in the container or be fluidically operatively connected to it. The at least one sensor can, for example, be a CO2 concentration sensor for measuring the CO2 concentration in the container. A theoretical amount of CO2 in the container (without absorption) can be determined from the amount of CO2 supplied (and possibly a measured amount of CO2 removed). The measure of absorption can thus be determined from the difference between the theoretical amount of CO2 and the actual (measured) amount of CO2 via the concentration sensor in the container. As described above, the predefined CO2 saturation may be reached, for example, when over a certain time interval the difference between the theoretical amount of CO2 and the actual amount of CO2 in the container is less than a predefined limit. Alternatively, the predefined CO2 saturation may have been reached, or the gassing may be stopped, when a limit value for the difference described above has been reached over the entire process duration to date. Alternatively, the predefined CO2 saturation may be reached when a theoretical limit value of the measure of the CO2 absorption determined by extrapolation has been reached. Determining the measure the occurred CO2 absorption by measuring the CO2 concentration is particularly suitable for containers that cannot be sealed gas-tight.

Alternatively or in addition to a CO2 concentration sensor, a measure of the occurred CO2 absorption by the concrete granulate can also be determined by measuring the pressure. The pressure of a given volume of gas comprising CO2 decreases when the CO2 is contact with the concrete granulate and CO2 is absorbed. I.e. the difference between a theoretical pressure, which should be present in the container without absorption, and the pressure actually measured in the container can be used as a measure of the occurred CO2 absorption that has taken place. The theoretical pressure may be determined at least approximately via the known container volume, as well as the supplied (and optionally a discharged) volume flow. The determination of the measure of the occurred CO2 absorption by measuring the pressure is particularly suitable for a gas-tight container, especially in the case of a non-continuous supply of gas to the container. As described above, the predefined CO2 saturation can be reached, for example, when the change in pressure over a certain time interval is smaller than a predefined limit value or a certain theoretical limit value of the measure of the occurred CO2 absorption has been reached.

In addition, the determination of the measure of the occurred CO2 absorption can also take into account a measured temperature. Since heat is released during the chemical reaction, this temperature change can also influence the pressure. Through a supplementary temperature measurement, the influence of the temperature change on the theoretical pressure can be taken into account. A supplementary temperature measurement can also be taken into account when determining the measure of the occurred CO2 absorption via the measurement of the CO2 concentration.

Alternatively or additionally, the determination of the measure of CO2 the occurred absorption can also take into account a measured weight. For this purpose, at least one sensor can be a scale or load cell operatively connected to the container and the control unit. For example, the weight of the concrete granulate measured before gassing can be used to determine at least approximately the volume available in the container for gassing. This can be used, for example, to determine the theoretical pressure. Furthermore, the difference in weight of the concrete granulate before gassing and the CO2-enriched concrete granulate after gassing can be determined. This provides information about the actual amount of CO2 absorbed. This information can, for example, be used by companies to trade CO2 certificates, also called emission certificates.

Depending on the design, the relative humidity in the container can also be measured, as gaseous water is released during the absorption of CO2. While the supplied gas may have a relative humidity of less than 1%, a relative humidity of 50%-95% may be present in the container when the maximum CO2 saturation is reached. The determination of the measure of the occurred CO2 absorption can thus additionally take into account the measured relative humidity.

As already described, the determination of the measure of the occurred CO2 absorption that has taken place can be determined more precisely by the measurements of the pressure and/or the CO2 concentration by a measurement of the weight and/or the temperature and/or the relative humidity. For example, the measured and/or known values can be related to each other via physical connections, such as the ideal gas equation and mass conservation laws. This enables a more precise and comprehensive monitoring of the CO2 absorption that has taken place.

Depending on the composition, the gas fed into the container may also include gaseous water and/or nitrogen and/or oxygen in addition to CO2. The gas to be fed into the container may be stored as a liquid and/or as a gas in a storage tank before being fed into the container. Advantageously, the gas comprises 95% to 100% CO2. Depending on the application, the gas may comprise renewable CO2. Renewable CO2 is understood to mean biogenic CO2 or CO2 extracted from the atmosphere. Biogenic CO2 has the advantage that it can usually be obtained in pure form and does not need to be processed. Biogenic CO2 can be obtained, for example, as a by-product of biomethane production or from the combustion of biomass (biological material comprising carbon, hydrogen and oxygen). Alternatively, the gas may also be an exhaust gas comprising 10-25% CO2. For example, an exhaust gas from a cement plant can be used to produce cement.

Primary concrete usually comprises sand, gravel and cement. The concrete granulate, which is obtained e.g. as demolition concrete, can also include mortar, depending on the type of previous use. The concrete granulate typically comprise 4-10% by weight of calcium oxide. In particular, the concrete granulate comprises hydrogenated cement. Hydrogenated cement is to be understood in such a way that the cement has undergone a reaction with water and the latter is attached to the cement. This reaction is called hydration and the reaction product is called hydrated cement. During hydration, the cement can bind up to 25% of its mass of water chemically and up to 15% of its mass physically. The demolition concrete can be crushed for processing. Good results are achieved when the particles have a diameter of 0.05 mm to 50 mm. For processing, the components of the concrete granulate usually cannot be separated from each other.

After reaching the predefined $CO_2$ saturation, the excess gas present in the container can be discharged. This can be processed for reuse and returned to the storage tank of the system. Alternatively, the excess gas can also be placed in a collection container that can be filled with concrete granulate, in which the method is carried out anew. The method can, for example, be carried out alternately in the container and the collecting container. Alternatively, the collecting container filled with further concrete granulate can be used as a passive filter, i.e. without active control of the $CO_2$ saturation. The concrete granulate arranged in this collecting container can absorb the excess gas at least partially, but in particular also completely.

Before the gas comprising $CO_2$ is supplied, air may be present in the container in addition to the concrete granulate. When the inlet valve is opened for gassing, a gas mixture comprising $CO_2$ and air is formed in the container. In order to increase the $CO_2$ concentration in the container, in particular during the initial filling of the container, in addition to the supply of gas comprising $CO_2$ the gas mixture can be continuously or non-continuously discharged from the container. This method advantageously increases the percentage of $CO_2$ in the container. The gas mixture discharged from the container can be treated as described for the excess gas or can be fed into a collection container. After reaching a predefined $CO_2$ concentration in the container, the discharge of the gas mixture and optionally also the supply of the gas can be stopped at least temporarily.

The discharge of gas from the container may be controlled by an outlet valve. The outlet valve, like the inlet valve, may comprise a flow sensor for determining the volume flow passed through the outlet valve, or a flow sensor may be connected upstream or downstream of the outlet valve. The upstream or downstream flow sensor is also operatively connected to the control unit. Alternatively or supplementary to the use of the flow sensor, the passed through volume flow can be stored as a data record in a control unit as a function of the setting of the outlet valve. In addition, a $CO_2$ concentration sensor can also be connected upstream or downstream of the outlet valve.

The supply and/or the discharge of the gas can be controlled by at least one pump which is operatively connected to the control unit. The supply of the gas into the container and/or the discharge of the gas mixture from the container and/or the discharge of the excess gas from the container can be induced, for example, by a negative pressure (in relation to an ambient pressure). The negative pressure can be between 80000 and 96000 Pascal. However, the method may also be carried out at ambient pressure or higher pressures.

The disclosure also relates to a system for processing concrete granulate, in particular for enrichment with $CO_2$, for subsequent recycling of the concrete granulate. The system comprises a storage tank and a container which is at least partially gas-tight. The gas to be fed into the container can be previously stored or temporarily stored in the storage tank in liquid form and/or in gaseous form. The container may comprise at least one opening for receiving and/or removing the concrete granulate. The container further comprises an inlet for feeding the gas into the container, which can be fluidically operatively connected to the storage tank via a supply line. An inlet valve is used to control the volume flow of gas to be fed into the container. The inlet valve can be a proportional valve. The system also comprises at least one sensor (as described above) and a control unit which is operatively connected to the at least one sensor and the inlet valve. The sensor is used to determine a measure of the occurred $CO_2$ absorption by the concrete granulate in the container by the control unit. The control unit is designed to control the volume flow of gas through the inlet valve. Furthermore, the control unit may also be operatively connected to a pump. The pump may be located in a supply line or a discharge line of the container. The pump may be a vacuum pump. The pump can be used to induce a vacuum as described above.

The control of the volume flow is advantageously carried out automatically. According to the method described above, the control unit is designed to repeatedly perform the following steps: supplying a volume flow of gas comprising $CO_2$ as a function of the measure of the occurred $CO_2$ absorption by the concrete granulate in the container, determined via the at least one sensor, and determining whether a predefined $CO_2$ saturation of the concrete granulate has been reached. If the predefined $CO_2$ saturation of the concrete granulate has not yet been reached, the previous step of gas supply can be continued until the predefined $CO_2$ saturation is present.

For an efficient gassing, the container is advantageously at least partially gas-tight. Depending on the design of the container, it may comprise a container base and at least one circumferential side wall. The at least one circumferential side wall surrounds a receiving space of the container for receiving the concrete granulate. The at least one side wall may be tubular, for example. The tubular side wall may have a round or an angular cross-section. Advantageously, the base and the at least one side wall are gas-tight. Depending on the application, the concrete granulate can be filled and extracted via a single opening. Advantageously, however, the apparatus comprises a first opening for filling with concrete granulate and a second opening for extracting the concrete granulate. For example, a first (upper) opening and a second (lower) opening opposite thereto with respect to the direction of gravity may be provided. In this case, when the second (lower) opening is opened, the concrete granulate can automatically fall out of the container. In this embodiment, in particular, only the second (lower) opening can be designed to be closed in a gas-tight manner, while the first (upper) opening can be left open. However, embodiments in which both openings can be closed in a gas-tight manner are also possible. For this purpose, the system can comprise at least one lid.

The at least one sensor is advantageously arranged in the container. This includes embodiments in which the sensor is arranged in a bulge, a piece of pipe or similar on a side wall and is fluidically operatively connected to the receiving space of the container. In order to determine the measure of the occurred $CO_2$ absorption by the concrete granulate, different types of sensors (as described above) can be used. Any combination of one or more of these sensor types is also conceivable. Since $CO_2$ is heavier than air and therefore tends to accumulate at the bottom of the container, several concentration sensors can, for example, be arranged one above the other in the container in the direction of gravity.

For a uniform and fast supply of $CO_2$ into the container, the inlet may comprise several gas inlet nozzles. The gas inlet nozzles may be arranged in the container base and/or at least one side wall, in particular arranged in a matrix-like manner. A matrix-like distribution of several inlet nozzles in the receiving space of the container is also conceivable. The gas inlet nozzles may be connected to each other via pipelines. Depending on the design of the container, the gas inlet nozzles may also be arranged distributed around the receiving space of the container, e.g. circularly. The container may further comprise an outlet for discharging the gas from the container. In a discharge line operatively connected to an outlet, an outlet valve and/or a flow sensor and/or a further $CO_2$ concentration sensor may additionally be arranged.

Depending on the design of the system, the system may also comprise several containers. For example, the gassing of the concrete granulate can be carried out in parallel in the several containers. Alternatively, the several containers can be connected in series. Excess gas from the first container can, for example, be directed into a second container/collection container in order to repeat the method as described above. Alternatively, however, it is also conceivable that the excess gas from the first container is merely, at least partially, but in particular completely passively absorbed by the concrete granulate arranged in the collecting container. The second container/collection container can thus be fluidically operatively connected to the discharge line of the first container. Alternatively or in addition, the second container/collection container can also be fluidically operatively connected to the storage tank via a separate supply line with a (second) inlet valve.

The described embodiments of the system can be used to carry out the method according to the disclosure. The previously described embodiments of the method also disclose correspondingly designed embodiments of the system for carrying out the method and vice versa.

BRIEF DESCRIPTION OF THE DRAWINGS

Aspects of the disclosure are explained in more detail with reference to the examples of embodiments shown in the following figures and the accompanying description. Showing.

DETAILED DESCRIPTION

Figure 1:
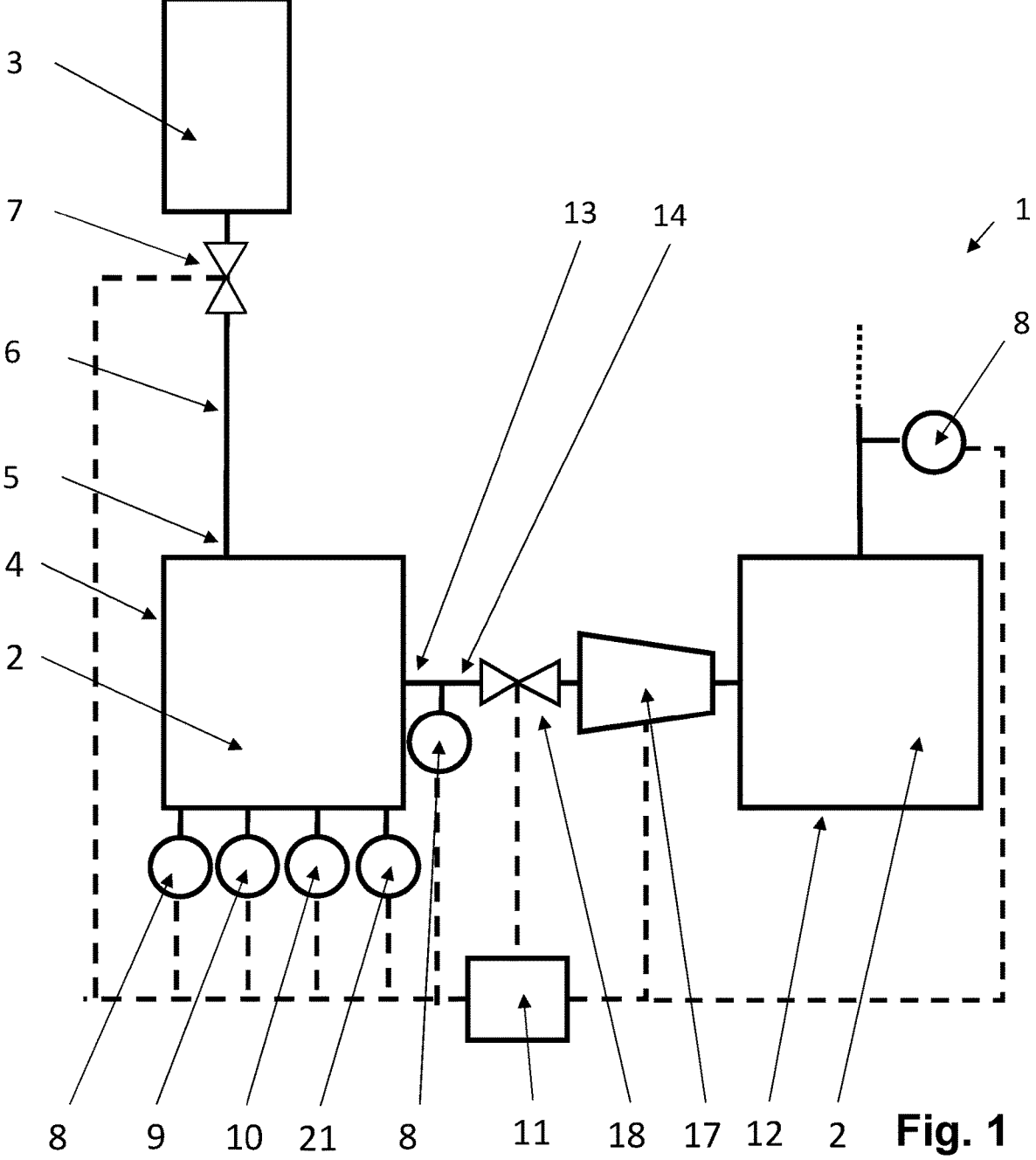
FIG. 1A first version of a system for processing concrete granulate according to the disclosure.

FIG. 1 shows a schematic view of a first version of a system 1 according to the disclosure for processing concrete granulate 2. The system 1 comprises a storage tank 3 for storing a gas comprising $CO_2$ and at least one at least partially gas-tight container 4, 12. In the embodiment shown, a first container 4 and a second (collecting) container 12 are present. Both containers 4, 12 may be closable in a gas-tight manner and each comprise (in an opened state) at least one opening (not shown) for filling and/or extracting the concrete granulate 2. The first container 4 comprises an inlet 5 for feeding the gas into the container 4, which can be fluidically operatively connected to the storage tank 3 via a supply line 6. The second container 12 is operatively connected to the discharge line 14, which is operatively connected to the outlet 13 of the first container. An inlet valve 7 is arranged in the supply line 6, between the storage tank 3 and the first container 4, which is used to control a supplied volume flow of gas into the container 4. The inlet valve 7 can be a proportional valve. The inlet 5 may comprise a plurality of gas inlet nozzles. For rapid filling, gas inlet nozzles may be arranged in a matrix-like manner in the receiving space and/or in the base and/or in the at least one side wall of the container 4 (not shown). A pump 17 and an outlet valve 18 may be arranged in the pipe between the first and second containers 4, 12. The pump 17 can be designed to draw gas from the storage tank 3 into the first container 4 (when the inlet valve 7 and outlet valve 18 are open). For this purpose the pump 17 may be a vacuum pump. In addition, a $CO_2$ concentration sensor 8 can be arranged in the discharge line of the first container 4 (or in the line between the two containers 4, 12 respectively). This is used to monitor how much $CO_2$ is discharged from the container 4.

Further sensors 8, 9, 10 are arranged in the first container 4. Based on the measured values of these sensors, a measure of the occurred $CO_2$ absorption by the concrete granulate 2 can be determined, as described above. A control unit 11 is used to control the supply of gas depending on the measure of the occurred $CO_2$ absorption. For this purpose, the sensors 8, 9, 10, the inlet valve 7, the outlet valve 18 and the pump 17 are operatively connected to the control unit 11. The inlet valve 7 and/or the outlet valve 18 may comprise a flow sensor. The control unit 11 can in particular be designed to automatically control the gas supply and/or the gas discharge until a predefined $CO_2$ saturation of the concrete granulate 2 in $CO_2$ is reached.

For the initial filling of the container 4 comprising the concrete granulate 2 with the gas, the inlet valve 7 and the outlet valve 18 can first be opened. The pump 17 can then draw the gas from the storage tank 3 into the container 4. The concentration sensor 8 in the discharge line 14 of the container 4 can monitor the $CO_2$ concentration. When a desired maximum $CO_2$ concentration is reached in the container 4, the outlet valve 18 can be closed. The inlet valve 7 can also be closed at least temporarily. The sensors 8, 9, 10 in the container 4 can measure the pressure, the $CO_2$ concentration and the temperature in the container. The measured values are used by the control unit to determine a measure for the absorption of $CO_2$. Depending on the measure for the absorption, gas comprising $CO_2$ is fed into the container so that an optimal and as uniform as possible $CO_2$ saturation, respectively enrichment, of the concrete granulate 2 with $CO_2$ takes place. When the predefined $CO_2$ saturation is reached, the excess gas can be discharged from the first container 4. Advantageously, this is filled, as in the case shown, into the collection container 12, which is also filled with concrete granulate 2. In this, the excess gas can advantageously be completely absorbed by the concrete granulate 2 in the collecting container 12. This can be monitored in particular by a further $CO_2$ concentration sensor 8, which is arranged in a discharge line of the collecting container 12. Alternatively or additionally, the difference in weight of the concrete granulate 2 before gassing and the $CO_2$-enriched concrete granulate 2 after gassing can also be determined. A scale 22 can be arranged on the container 4 for measuring the weight or the weight difference.

Figure 2:
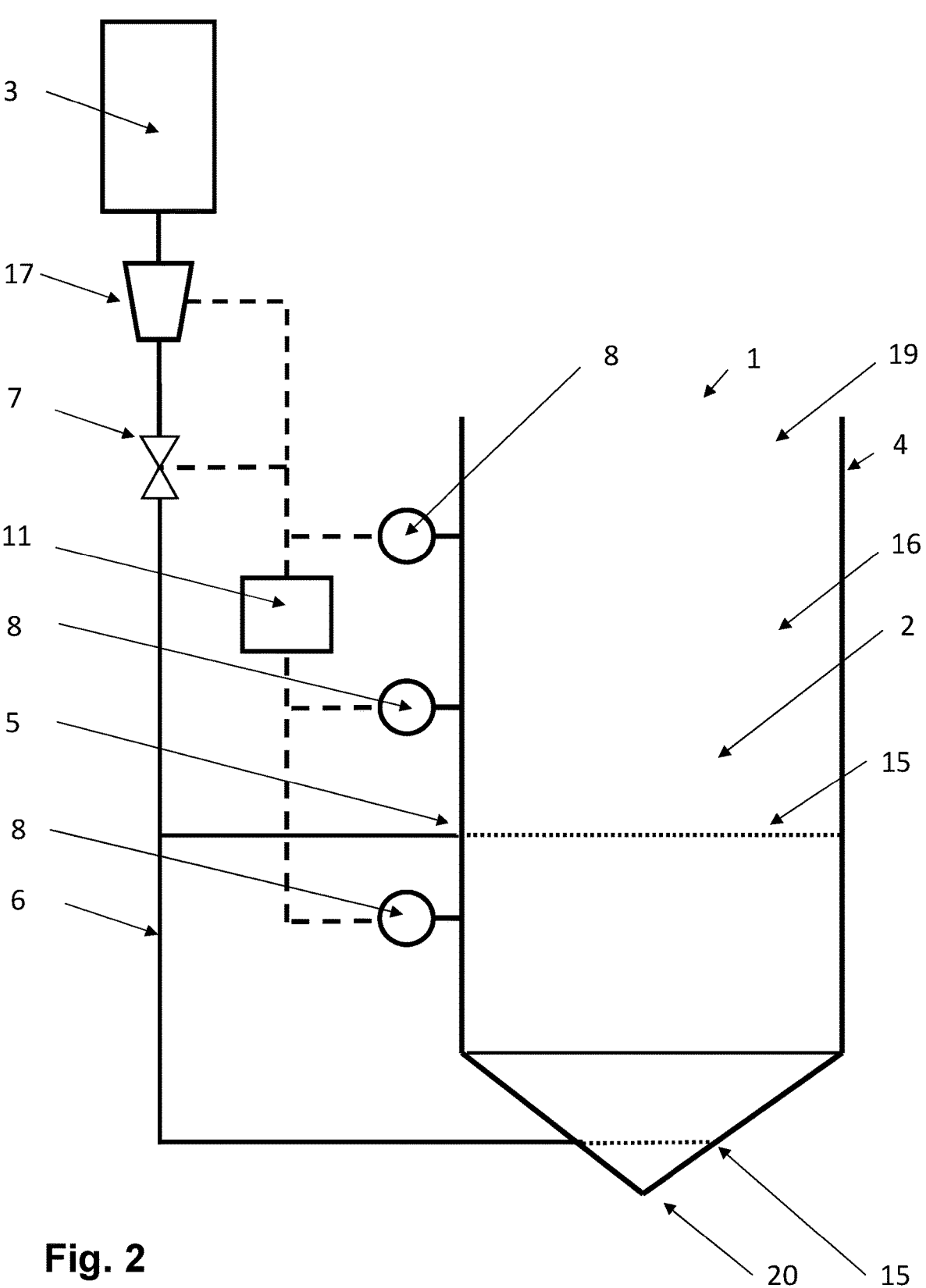
FIG. 2A second version of a system for processing concrete granulate according to the disclosure.

FIG. 2 shows a schematic view of a second version of a system 1 according to the disclosure for processing concrete granulate 2. The system 1 also comprises a storage tank 3 for storing a gas comprising $CO_2$ and an at least partially gas-tight container 4. In the embodiment shown, the container 4 is open at the top and comprises an upper opening 19 for filling concrete granulate 2. A lower opening 20 for extracting the concrete granulate is arranged in a first direction opposite the upper opening 19 (direction of gravity). The lower opening 20 is shown closed in a gas-tight manner. A circular side wall of the container is arranged between the upper and lower openings 19, 20. Advantageously, the circular side-wall is also gas-tight. The circular side wall can be round or angular in cross-section. After filling with concrete granulate 2, the inlet valve 7 is opened and the container 4 is filled from bottom to top with gas comprising CO2. For this purpose, a pump 17 is arranged in the supply line 6 in the case shown. However, other arrangements are also conceivable. For a quick supply of gas, the container 4 advantageously comprises circularly arranged gas inlet nozzles 15. These can be arranged in the receiving space for the concrete granulate 2 of the container 4 and be connected to one another by lines or surround the receiving space of the container. In the case shown, two circularly arranged groups of gas inlet nozzles 15 are arranged one above the other in the first direction. At least one CO2 concentration sensor 8 may be arranged in the container 4. Advantageously, however, several CO2 concentration sensors 8 are arranged distributed in the first direction, each of which is operatively connected to a control unit 11. Alternatively or in addition, other sensors such as sensors for measuring temperature, pressure or relative humidity are also possible. The CO2 concentration sensors 8 advantageously continuously measure the CO2 concentration in the container 4. The control unit 11 controls the gas supply depending on a certain measure of the occurred CO2 absorption by the concrete granulate 2. The measure of the occurred CO2 absorption is determined by the control unit 11 via the measurements of the sensor(s) 8, as described in connection with the method above. The measure of the occurred CO2 absorption that has taken place can be the difference between the CO2 fed into the container 4 and the measured CO2 present in the container 4. Depending on the amount of CO2 already absorbed, gas comprising CO2 can be added to container 4. This ensures efficient and uniform saturation of the concrete granulate 2 in the container 4. The CO2 concentration sensor 8, which is uppermost in the direction of gravity, can be used to ensure that a predefined filling level 16 of gas in the container 4 is not exceeded. This can prevent gas from leaking from the top opening 19. Furthermore, the method can be controlled in such a way that there is always a sufficiently thick layer of uncarbonated or only partially carbonated concrete granulate 2 on the surface (facing the first opening 19) in the container 4. This layer can be used as a filter layer to absorb unwanted rising CO2. When the CO2-enriched concrete granulate 2 is extracted from the container 4 through the lower opening 20, this layer sinks to the bottom and can, for example when refilling further concrete granulate 2 from above, be provided with a predefined CO2 saturation accordingly when the method is carried out repeatedly.

The invention claimed is:

1. A method for processing concrete granulate for subsequent recycling of the concrete granulate, comprising the following method steps:
   a. Filling an at least partially gas-tight container with concrete granulate;
   b. Supplying a volume flow of gas comprising $CO_2$ into the container as a function of a measure of an occurred $CO_2$ absorption by the concrete granulate in the container, the measure of the occurred $CO_2$ absorption being determined via at least one sensor;
   c. Determining whether a predefined $CO_2$ saturation of the concrete granulate has been reached and, if not, continuing with method step b; and
   d. In response to a determination that the predefined $CO_2$ saturation of the concrete granulate has been reached, removing the concrete granulate enriched with $CO_2$ for use in producing recycled concrete.

2. The method according to claim 1, wherein the gas fed into the container comprises 95% to 100% $CO_2$ .

3. The method according to claim 2, wherein the gas fed into the container is renewable $CO_2$ .

4. The method according to claim 1, wherein the measure of the occurred $CO_2$ absorption is determined via a measurement of at least one of a pressure in the container and a $CO_2$ concentration by the at least one sensor.

5. The method according to claim 4, wherein the measure of the occurred $CO_2$ absorption additionally takes into account at least one of a measured temperature, a measured weight, and a measured relative humidity in the container.

6. The method according to claim 1, further comprising reducing or temporarily interrupting the supplied volume flow of gas when a desired filling level of the container with at least one of the gas and a predefined $CO_2$ concentration in the container is reached.

7. The method according to claim 6, wherein the reduced or temporarily interrupted volume flow of gas comprising $CO_2$ compensates for the $CO_2$ already absorbed by the concrete granulate arranged in the container.

8. The method according to claim 6, wherein the predefined $CO_2$ concentration in the container is above 95%.

9. The method according to claim 1, wherein the predefined $CO_2$ saturation of the concrete granulate is reached, when the change in the measure of the occurred $CO_2$ absorption falls below a limit value in a predefined time interval.

10. The method according to claim 1, wherein, after reaching the predefined $CO_2$ saturation, excess gas is led from the container into a collecting container which is filled with further concrete granulate which at least partially absorbs the excess gas.

11. The method according to claim 10, wherein the method steps b to d according to claim 1 are repeated in the collecting container.

12. The method according to claim 10, wherein the concrete granulate completely absorbs the excess gas.

13. A system for processing concrete granulate for subsequent recycling of the concrete granulate according to the method of claim 1, the system comprising
   a. an at least partially gas-tight container with
      i. at least one opening configured for at least one of filling and extracting the concrete granulate, and
      ii. an inlet configured to supply a gas comprising $CO_2$ into the container, wherein the inlet is fluidically operatively connectable to a storage tank via a supply line, and
   b. an inlet valve configured to control a supplied volume flow of the gas into the container;
   c. at least one sensor configured to determine a measure of an occurred $CO_2$ absorption by the concrete granulate in the container; and
   d. a control unit which is operatively connected to the at least one sensor and to the inlet valve and which is configured to control the supplied volume flow via the inlet valve.

14. The system according to claim 13, wherein the control unit is configured to carry out the following sequence of steps automatically:
   Supply of the volume flow of gas comprising $CO_2$ into the container as a function pf the measure oof the occurred $CO_2$ absorption by the concrete granulate in the container determined via the at least one sensor;
   b. Determination whether a predefined $CO_2$ saturation of the concrete granulate has been reached.

15. The system according to claim 13, wherein at least one sensor is arranged in the container and is at least one of a pressure sensor for measuring a pressure and a concentration sensor for measuring a $CO_2$ concentration.

16. The system according to claim 15, wherein several concentration sensors are arranged one above the other in the direction of gravity.

17. The system according to claim 13, wherein the inlet comprises a plurality of gas inlet nozzles which are arranged in a matrix-like manner in at least one of a receiving space of the container, on at least one side wall of the container, and on a base of the container.

18. The system according to claim 13, wherein the system comprises a collecting container for receiving further concrete granulate, configured to be fluidically operatively connected to the container via a discharge line of the container.

19. A concrete granulate produced according to claim 1, wherein the concrete granulate have a $CO_2$ saturation of at least 5 kg $CO_2$ per 1000 kg.

20. A concrete comprising the concrete granulate according to claim 19.

* * * * *